(12) United States Patent
Karrer

(10) Patent No.: US 6,238,153 B1
(45) Date of Patent: May 29, 2001

(54) RAIL CAP FOR PICKUP TRUCKS

(76) Inventor: Robert B. Karrer, 3489 Fulton Avenue, Smithers (CA), V0J 2N0

( * ) Notice: Subject to any disclaimer, the term of this patent is extended or adjusted under 35 U.S.C. 154(b) by 0 days.

(21) Appl. No.: 08/986,326

(22) Filed: Dec. 5, 1997

(51) Int. Cl.$^7$ .................................................. B60P 7/08
(52) U.S. Cl. .................... 410/102; 410/104; 410/106; 410/143; 410/144; 296/36
(58) Field of Search ................................ 410/143, 144, 410/102, 104, 105, 106, 110, 116; 296/36, 3, 167

(56) References Cited

U.S. PATENT DOCUMENTS

| | | |
|---|---|---|
| 4,547,014 | 10/1985 | Wicker . |
| 4,575,146 | 3/1986 | Markos . |
| 4,812,093 * | 3/1989 | Miller, Jr. ............................. 410/110 |
| 4,850,770 * | 7/1989 | Miller, Jr. ............................. 410/110 |
| 4,936,724 | 6/1990 | Dutton ................................. 410/110 |
| 4,944,612 | 7/1990 | Abstetar et al. . |
| 4,958,876 | 9/1990 | Diaco et al. . |
| 5,052,739 | 10/1991 | Irwin . |
| 5,139,375 * | 8/1992 | Franchuk ............................. 410/105 |
| 5,150,940 | 9/1992 | Kennedy . |
| 5,154,478 | 10/1992 | Erickson et al. . |
| 5,228,736 | 7/1993 | Dutton . |
| 5,259,711 * | 11/1993 | Beck .................................... 410/104 |
| 5,393,114 | 2/1995 | Christensen . |
| 5,419,602 | 5/1995 | VanHoose . |
| 5,480,206 * | 1/1996 | Hathaway et al. ..................... 296/36 |
| 5,494,327 | 2/1996 | Derecktor . |
| 5,584,521 * | 12/1996 | Hathaway et al. ..................... 296/36 |
| 5,674,033 * | 10/1997 | Ruegg .................................. 410/104 |
| 5,688,087 * | 11/1997 | Stapleton et al. ................. 410/143 X |
| 5,738,471 * | 4/1998 | Zentner et al. ....................... 410/110 |
| 5,873,688 * | 2/1999 | Wheatley ............................. 410/106 |

FOREIGN PATENT DOCUMENTS 1330572   7/1994   (CA) .

* cited by examiner

*Primary Examiner*—Stephen T. Gordon
(74) *Attorney, Agent, or Firm*—Christopher R. Scott

(57) ABSTRACT

The invention provides a rail cap for use on the wall of the cargo area of a pickup truck. The rail cap includes an elongate main body having first and second portions generally at right angles to one another, and a clamp extending along the main body. The clamp has an elongate element, a first actuator coupling the elongate element to the second portion, and operable to draw the elongate element towards the second portion, and a second actuator coupled to the elongate element and operable to push the elongate element away from the first portion. The rail cap can be assembled on the bed rail of a pickup truck without modifying the bed rail by drilling.

22 Claims, 5 Drawing Sheets

RAIL CAP FOR PICKUP TRUCKS

FIELD OF THE INVENTION

This invention relates to an improved cap for attachment to the rails located at the tops of the walls bordering the cargo bed of a pickup truck to protect the rails and to facilitate attaching various structures to the cargo bed for use with the truck.

BACKGROUND OF THE INVENTION

Pickup trucks are used for a great variety of purposes ranging from simple transportation to heavy duty uses in rough terrain. The cargo bed is unprotected when the pickup truck is delivered and the user commonly makes modifications to improve the utility of the cargo bed. These modifications include bed rail caps attached to the rails on the tops of the side walls of the cargo area to thereby provide protection and also to provide attachment points for various accessories.

One of the most common ways of attaching bed rail caps is to drill through the rail and use bolts to hold the caps in place. The resulting structure tends to be unsightly and the possibility exits that the bolts will be drilled in the wrong place. Also, if the rails are removed the drilled holes will be evident.

It is also desirable to maximize the capability of the bed rail cap for a variety of purposes related to accessories commonly found with pickup trucks. These include caps or covers which extend over the cargo area to provide protection from the weather, roll bars, ring anchors for attaching loads, bed liners, etc. In many instances bed rail caps can take some of these accessories to the exclusion of others and the user must decide which accessory is to be used. It would be desirable if the bed rail cap had more capability and could receive a variety of accessories contemporaneously.

SUMMARY OF THE INVENTION

In one of its aspects the invention provides a bed rail cap for use on a side rail of a pickup truck cargo bed. The side rail has a horizontal top section and an upright inner section extending downwardly from an inner extremity of the top section. The rail cap has an elongate main body including a generally L-shaped cross-section made up of a first portion for engagement on the top section, and a second portion extending at about 90 degrees to the top section for engagement on the inner section. The second portion is proportioned to extend downwardly beyond the inner section and a clamp is coupled to the second portion for location outwardly of the inner section and under the top section. The clamp has an elongate element, a first actuator operable to clamp the inner section against the second portion, and a second actuator operable to clamp the top section against the first portion, and the main body defines attachment structure for receiving accessories.

BRIEF DESCRIPTION OF THE DRAWINGS

The invention will be better understood with reference to the drawings, in which.

DESCRIPTION OF THE PREFERRED EMBODIMENT(S)

Figure 1:
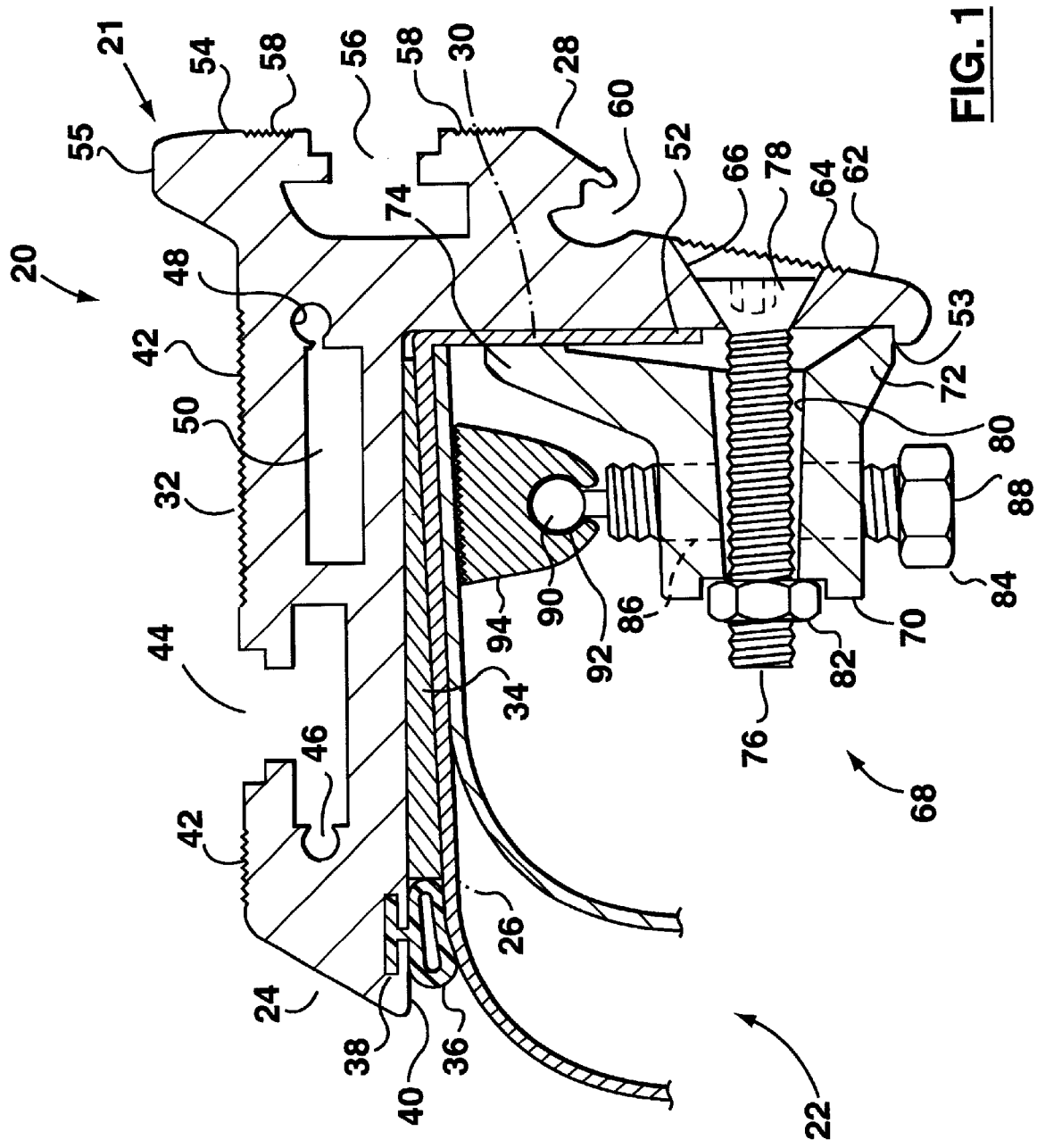
FIG. 1 is a sectional end view of a rail cap according to a preferred embodiment of the invention and shown in the process of being mounted on a rail of an exemplary wall of a cargo bed of a pickup truck.

Reference is first made to FIG. 1 which illustrates a bed rail cap designated generally by the numeral 20 and shown in position in relation to a side wall 22 of a pickup truck cargo bed. The rail cap is illustrated as if it were actually attached to the exemplary wall and consists essentially of a main body 21 having a top engaging first portion 24 which extends across a top section 26 of the wall 22 and a downwardly extending side engaging second portion 28. Portions 24 and 28 are arranged generally at right angles to one another and the portion 28 is in engagement with an inner section 30 of the truck wall. In order to maintain an upper surface 32 of the portion 24 horizontal, an optional solid shim 34 is provided to take up variations in shape and to accommodate angular variations between the truck in a section 30 and the top section 26. A resilient tubular seal 36 is accommodated in a complementary T-slot 38 formed in a lower surface 40 of the first portion 24 to form a weather seal between this portion and the wall 22 of the truck.

The upper surface 32 of the first portion 24 has longitudinal serrations 42 for improved grip. Also, the surface is interrupted by a necked T-slot 44 for use in attaching accessories as will be explained. The T-slot includes a circular-sectioned opening 46 for receiving end screws to attach an end cap. A further screw can be retained in a similar circular-sectioned opening 48 associated with a cavity 50 which is provided simply to reduce the mass of metal in the extrusion used to make the main body 21 of the rail cap.

As mentioned, the first and second portions 24, 28 meet at a right angle and the portion 28 has an outer surface 52 in engagement with the inner section 30 of the truck wall and extends downwardly beyond the wall terminating at a ledge 53 projecting outwardly for use as will be explained. The second portion 28 includes an inner surface 54 (i.e. a surface facing inwardly of the truck wall 22), and this surface defines serrations 58 for better grip. A further necked T-slot 56 is provided in surface 54 for attaching accessories as will be explained. Also, the surface 54 terminates adjacent a downwardly opening slot 60 which is shaped to receive a further accessory as will be described with reference to subsequent drawings. The slot is above and adjacent a lower surface 62 which also includes serrations 64 and defines a counter-sunk opening 66.

The first portion 24 extends inwardly to meet an upstanding rib 55 which can be considered to be a continuation of the second portion 28. This rib prevents rain water flowing from the main body 21 into the cargo area, and is used in association with accessories as will be described.

The main body 21 of the rail cap 20 is attached to the wall using a clamp designated generally by the numeral 68 and consisting essentially of an elongate element 70 which has a pivot 72 in engagement with the ledge 53 for location, and a pad 74 positioned for engagement with the inner section 30 of the rail on wall 22. The element 70 is drawn towards the second portion 28 by a first actuator 76 in the form of a bolt 78 having a counter-sunk head engaged in the opening 66 and projecting through a tapered clearance opening 80 which permits a degree of angular adjustment about the pivot 72 as the element 70 is drawn towards the second portion 28 of the main body 21. The load necessary to cause the clamping action is created by using suitable tools on the bolt 78 and a nut 82 to drive the bolt through the nut.

The clamp 68 also includes a second actuator 84 which extends through a threaded opening 86 in the element 70 and spaced longitudinally from the opening 80. In practice, there will be a series of first and second actuators spaced along the element 70 to provide clamping action along the length of the wall 22.

The second actuator 84 consists of a bolt 88 threadably engaged in the opening 86 and having a spherical end 90 engaged in an elongate cylindrical recess 92 formed in a seating element 94. Consequently the element 94 is free to find proper seating against the underside of the wall 22 and the face of the element is serrated for better gripping.

It will be evident that the clamping element permits the user to use the first actuators 76 to locate and retain the rail cap 20 on the wall after first placing suitable shims 34 under the first portion 24. Before completely tightening the first actuator, it would be preferable to load the second actuator 84 to ensure adequate engagement, and the actuators would then be tightened sequentially to bring the main body 21 into firm engagement with the rail of the wall 22.

It would of course be preferable to use a locknut for the nut 82 in order to provide some friction between the nut 82 and the bolt 80. In the case of the bolt 88 a locknut could also be provided. Alternatively, some deformation of the threads or other means could also be used to maximize friction and minimize the risk of separation by vibration.

In practice, the rail cap 20 will be used in pairs. One will be provided on each of the rails of the side walls at the sides of the cargo bed to provide structure for attachment of accessories and other uses from either side of the cargo bed.

The main body 21, elongate element 70, and seating element 94 are preferably aluminum extrusions anodized as necessary for better durability. The bolts 78, 88 and nut 82 are preferably coated steel bolts to minimize corroding action between dissimilar materials.

Figure 2:
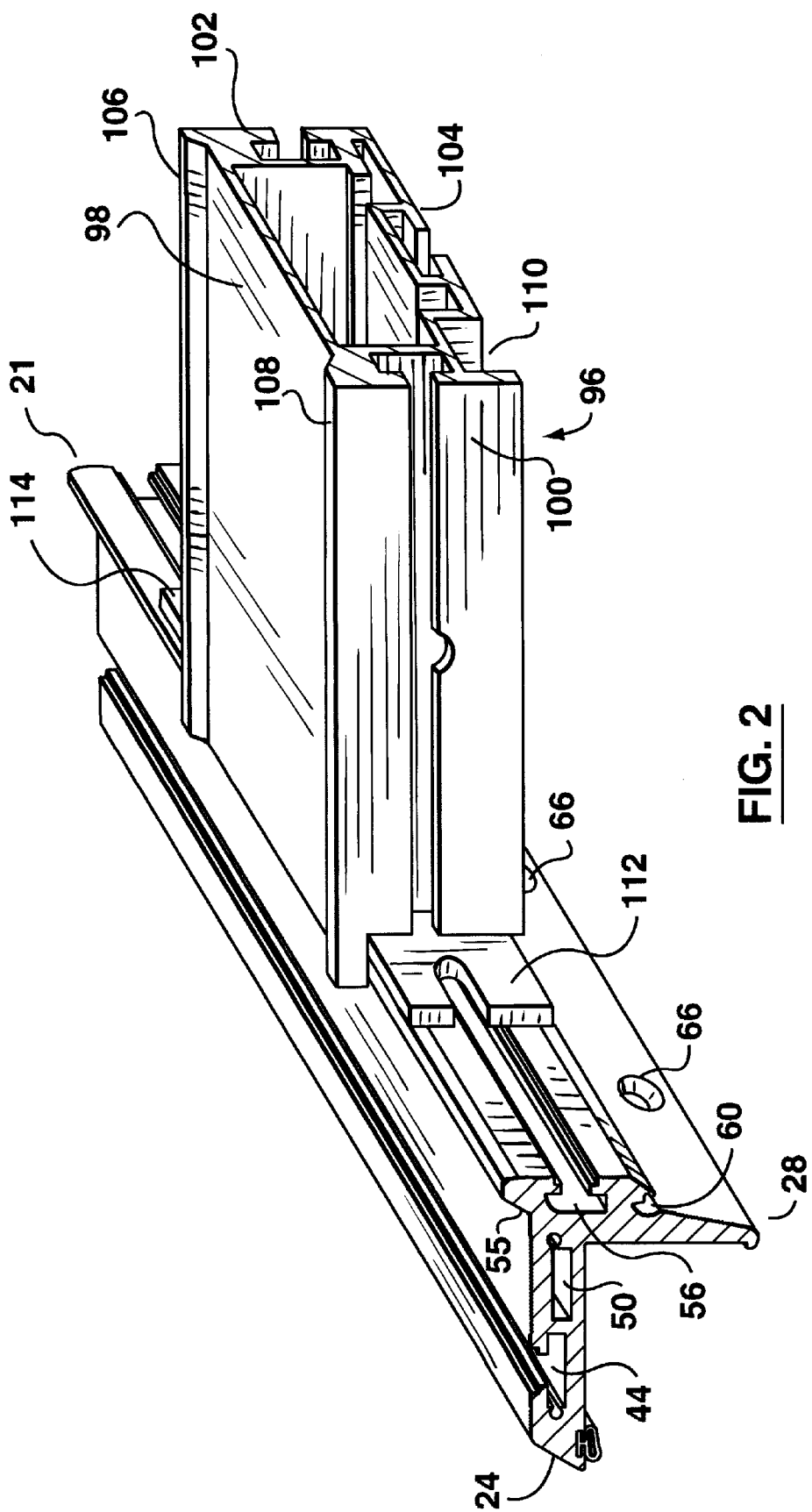
FIG. 2 is an isometric view showing the bed rail cap and a bridge in position to be attached to the rail cap.

Reference is next made to FIG. 2 which shows a portion of the main body 21 and its relationship to a bridge designated generally by numeral 96. The bridge would normally be used with two rail caps, one on each side of the cargo bed, and is attached in similar fashion to both of the caps. As seen in FIG. 2, the bridge is an extrusion having a top 98, sides 100, 102, and a bottom 104. The top 98 is plain for supporting accessories and is bordered by a pair of parallel ridges 106, 108 so that any rain water falling on the top 98 will be guided by the ridges 106, 108 and tend towards the associated rail caps, and in particular the main body 21. The sides 100, 102 are shown with T-slots so that the bridge can be used for attachment purposes, and similarly, the bottom has a T-slot and also a recess 110. This recess can receive a divider extending vertically within the cargo area for dividing the cargo area between different loads, and the bottom of the divider can be set in a similar recess is a bridge which has been inverted and secured to the floor of the cargo bed. Also, all of the T-slots can be used to attach these loads and support them in the cargo area.

The top 98 projects outwardly beyond the side walls 100, 102 which terminate at flanges 112, 114 used to attach the bridge to the T-slot 56 in the main body 21. This connection is made using conventional T-shaped anchor bolts and nuts, (not shown).

It will also be recognized that the top 98 projects over the rib 55 on the main body to transfer rain water over the rib 55 and onto the top of the main body where it will be dissipated. This arrangement is useful when used in conjunction with truck bed enclosure lids which rest, hinge and drain on the top 98 of the bridge. The drainage will ensure that water does not find its way under the lid. Other similar accessories could be used in the same fashion.

It will be evident that the bridge 96 will assist in stabilizing rail caps on the walls of the cargo area because they will tend to resist the effect of loads placed on the rail caps by accessories.

As has been mentioned, the rail cap is particularly useful in receiving a variety of accessories either individually or in groups. This is demonstrated in FIG. 3 which is exemplary to show the attachment of such accessories. Starting at the bottom, a side wall 116 of a cargo bed liner is shown. This wall would normally be of plastics material and is attached to an extruded hinge element 118 having an upper end 120 shaped to fit in the slot 60. The resulting hinge structure is of conventional form and allows the hinge element 116 to rotate in an anti-clockwise direction (as drawn) until the element is released from the slot 60. To put it back, it is engaged with the hinge element generally horizontal and then the element is rotated back to the position shown in FIG. 3. As a result, the liner can be placed in the cargo area and then held in place by engaging hinge elements 118 and rotating them into position before making the final attachment to the liner. If preferred the element 116 can be proportioned to be retained in the slot so that it can be engaged only by sliding the element longitudinally into the slot. This exemplary accessory could also be attached in other ways by modifying the slot and hinge element within the scope of the invention.

Above the hinge element 118, a ring anchor 122 is attached to the rail cap 20 at the T-slot 56. This is a conventional arrangement using a bolt 124 and ties 126 attached to the ring anchor 122 in conventional fashion.

The rail caps 20 can also receive a canopy or cover as is often used for pickup trucks. Part of an exemplary cover is indicated generally by the numeral 128 and it will be seen that the cover rests on the rib 55 as well as on the upper surface 32 of the main body 21. The method of attachment of the cover 128 will be described with reference to FIG. 4.

The upper surface 32 also can be used to support a cab guard or roll bar indicated generally by the numeral 130. This structure is shown behind a further ring anchor 132 having a tie 134 and both the roll bar 130 and the ring anchor 132 are attached to the T-slot 44 using bolts in a same fashion as the bolt 124 previously described.

Figure 3:
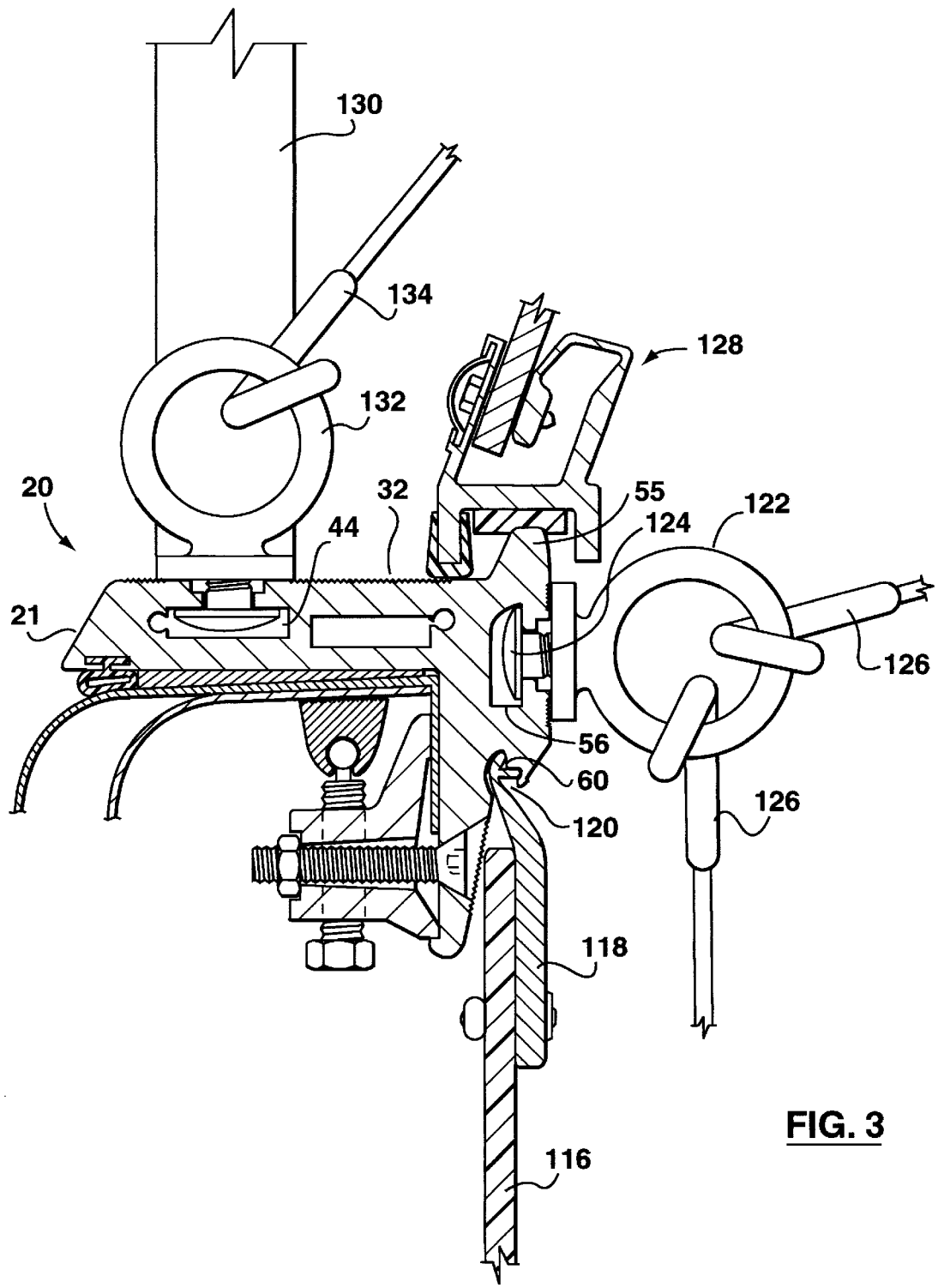
FIG. 3 is a view similar to FIG. 1 and showing the attachment of various exemplary accessories to the bed rail cap.

It can therefore be seen from FIG. 3 that numerous accessories can be attached to the rail cap 20 and that the structure is such that these accessories can be used simultaneously. Apart from those shown in FIG. 3, it will be clearly possible to include a bridge such as that shown in FIG. 2 and if necessary, more than one bridge.

Figure 4:
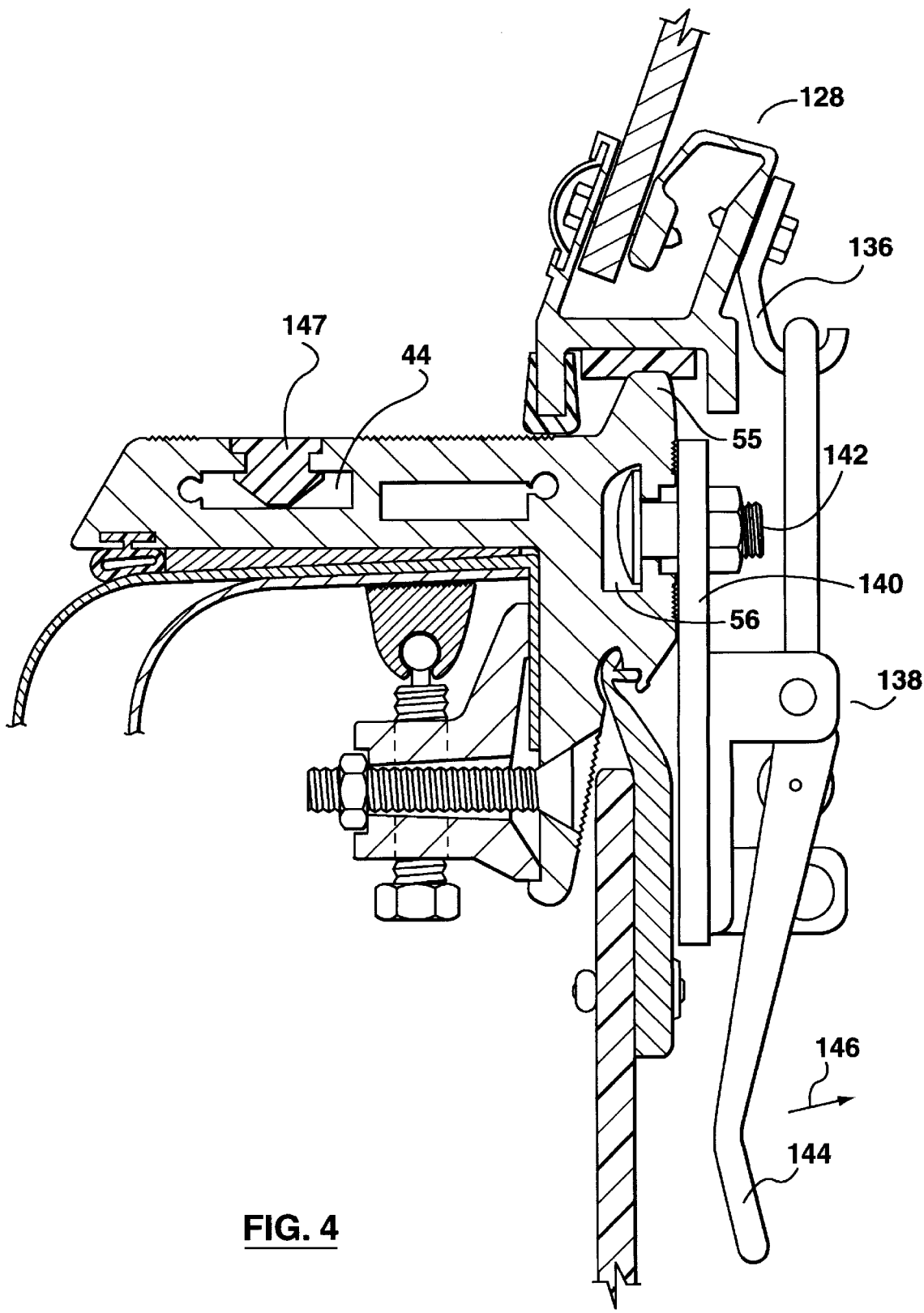
FIG. 4 is also a view similar to FIG. 1 and illustrating preferred structure for attaching one of the accessories to the rail cap.

Turning now to FIG. 4, the cover 128 includes a series of upwardly open hooks 136 (one of which is shown) for cooperation with over-centre latches such as latch 138. These latches are mounted on a baseplate 140 and secured by a bolt 142 engaged in the T-slot 56. The latch 138 has a downwardly extending lever 144 for movement in the direction of arrow 146 to release the cover 128. Once the lever has been moved the latch can be lifted off the hook 136 to facilitate removal of the cover. Of course the latches can also be removed using the bolts 142. To assemble the structure, the sequence of events is reversed.

FIG. 4 also illustrates the use of a trim strip 147 in T-slot 44 to enhance the appearance when the T-slot is not in use.

The strip will also resist ingress of water and dirt to maintain the T-slot in clean condition.

Figure 5:
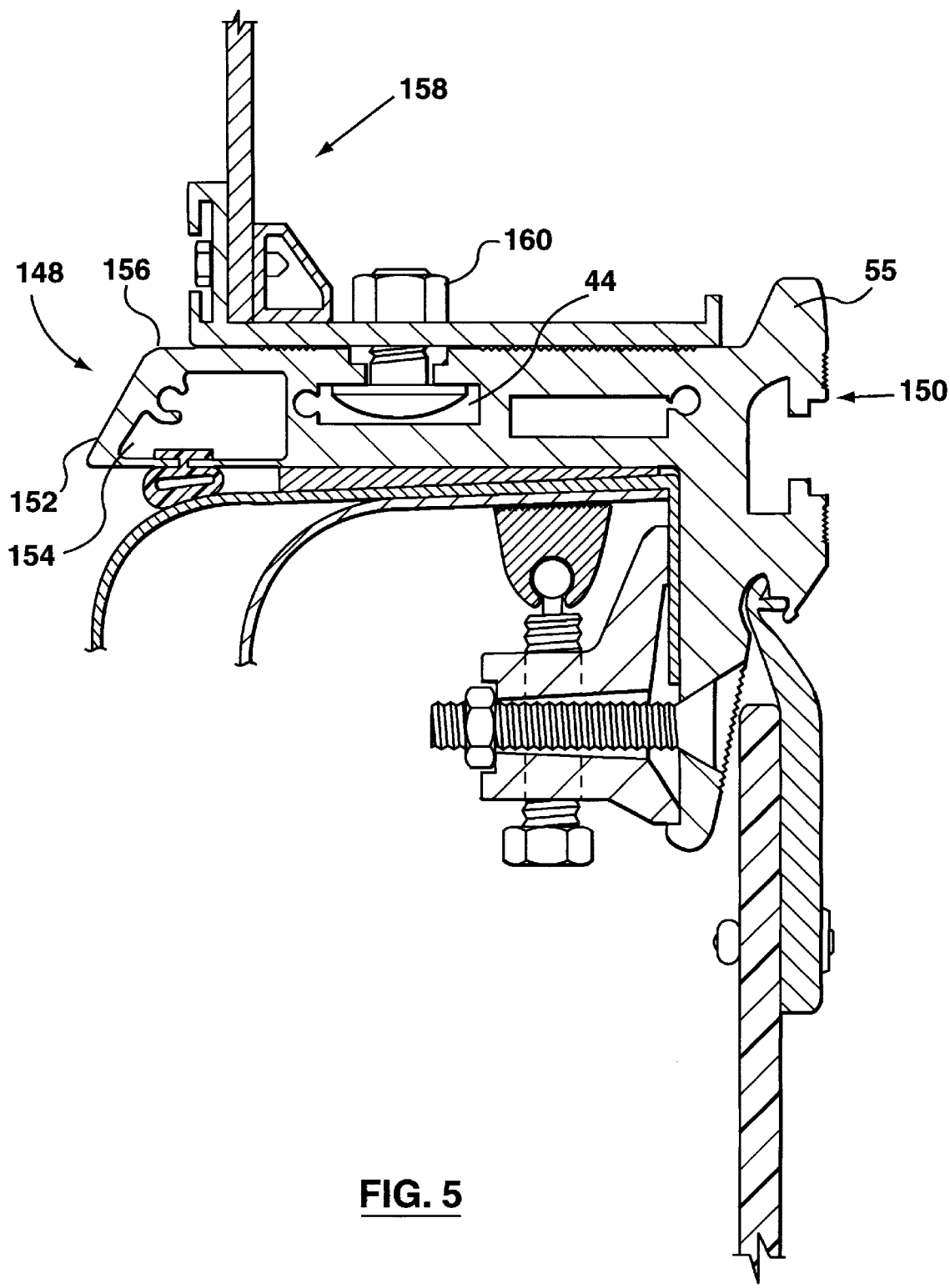
FIG. 5 is a sectional view similar to FIG. 1 and showing an alternative embodiment of rail cap with accessories mounted on the rail cap.

A second embodiment of the rail cap is shown in FIG. 5 and designated generally by the numeral 148. This structure differs from that previously described in that a main body 150 includes a top section 152 extending outwardly to include a cavity 154. This increases the width of a top surface 156 and makes full use of the width between the outer surfaces of the walls of the pick up truck to accommodate a cover shown generally at 158. This cover is held in place using bolts 160 in T-slot 44.

It will be evident that the extrusion forming the main bodies 21 and 150 can take numerous forms. In general, however, they will have portions at right angles to one another in order to accommodate a clamp such as clamp 68. A variety of slots can be accommodated as required in accordance with the invention as claimed. Similarly other extrusions can be modified and the arrangement of the clamp adjusted to meet specific requirements. All such modifications are within the scope of the invention as described and claimed.

What is claimed is:

1. A rail cap for use on the side rail of a cargo bed of a pickup truck, the side rail having a horizontal top section and an upright inner section extending downwardly from an inner extremity of the top section, the rail cap including:
   an elongate main body having a generally L-shaped cross-section and including a first portion for engagement on the top section, and a second portion extending at about 90 degrees to the first portion for engagement on the inner section, the second portion being proportioned to extend downwardly beyond the inner section;
   a clamp coupled to the second portion for location outwardly of the inner section and under the top section, the clamp having an elongate element, a first actuator operable to clamp the inner section against the second portion, and a second actuator operable to clamp the top section against the first portion; and
   the main body defining attachment structure for receiving accessories.

2. A rail cap as claimed in claim 1 in which the second portion terminates at a ledge extending generally in parallel with the first portion and in which the elongate element is located on the ledge.

3. A rail cap as claimed in claim 1 in which the first actuator is a series of bolt and nut assemblies, the bolts passing through the second portion and through the elongate element with the corresponding nuts positioned to draw the elongate element towards the second portion.

4. A rail cap as claimed in claim 2 in which the elongate element includes an elongate pivot in engagement with the ledge and an elongate pad for engaging the outer side of the truck inner section, the first actuator being located between the pivot and the pad.

5. A rail cap as claimed in claim 4 in which the first actuator is a series of bolt and nut assemblies, the bolts passing through the second portion and through the elongate element with the corresponding nuts positioned to draw the elongate element towards the second portion.

6. A rail cap as claimed in claim 4 in which the elongate element defines tapered openings receiving the respective bolts to permit the elongate element to adjust into engagement with the ledge and the truck inner section.

7. A rail cap as claimed in claim 1 in which the attachment structure defines at least one T-slot in the first portion of main body.

8. A rail cap as claimed in claim 1 in which the attachment structure defines at least one T-slot in the second portion of the main body.

9. A rail cap as claimed in claim 1 in which the attachment structure defines a downwardly opening slot in the second portion of the main body.

10. A rail cap as claimed in claim 1 in which the main body further includes an elongate rib projecting from the first portion and aligned with the second portion to deflect water outwardly of the truck.

11. The combination of a pair of rail caps as claimed in claim 8 and a bridge extending between the rail caps, the bridge including fasteners for attaching the bridge to the respective T-slots in the rail cap.

12. The combination of a pair of rail caps as claimed in claim 10 and a bridge extending between the rail caps, the bridge extending over the respective ribs of the rail caps and including parallel ridges extending upwardly to provide drainage for rain water along the bridge, over the ribs and onto the rail caps.

13. The combination of a pair of rail caps as claimed in claim 12 in which the bridge further includes fasteners for attaching the bridge to the respective T-slots in the respective second portions of the rail caps.

14. A rail cap as claimed in claim 1 in which the first portion of the rail cap defines an upper surface for supporting accessories.

15. A rail cap as claimed in claim 14 and further including an elongate rib projecting upwardly from said upper surface, the rib being generally in alignment with the second portion of the rail cap.

16. A rail cap for use on the wall of the cargo area of a pickup truck, the rail cap including:
   an elongate main body having first and second portions generally at right angles to one another; and
   a clamp including an elongate element extending along the main body, a first actuator coupling the elongate element to the second portion and operable to draw the elongate element towards the second portion and a second actuator coupled to the elongate element and operable to push the elongate element away from the first portion.

17. A rail cap as claimed in claim 16 in which the second portion terminates at a ledge extremity generally in parallel with the first portion and in which the elongate element is located on the ledge.

18. A rail cap as claimed in claim 17 in which the elongate element includes an elongate pivot in engagement with the ledge and an elongate pad for engaging a truck inner section, the first actuator being located between the pivot and the pad.

19. A rail cap as claimed in claim 1 in which the attachment structure defines at least one T-slot in the first portion of the main body.

20. A rail cap as claimed in claim 1 in which the attachment structure defines at least one T-slot in the second portion of the main body.

21. A rail cap as claimed in claim 1 in which the attachment structure defines a downwardly opening slot in the second portion of the main body.

22. A rail cap as claimed in claim 21 and further comprising an elongate hinge element, and in which the hinge element and the downwardly opening slot are proportioned to permit the hinge element to be rotated into the slot and then aligned generally with the second portion to prevent linear separation of the hinge element and the downwardly opening slot.

* * * * *